United States Patent
Kitaura et al.

(10) Patent No.: US 12,339,570 B2
(45) Date of Patent: Jun. 24, 2025

(54) IMAGE CAPTURING APPARATUS

(71) Applicant: SHARP KABUSHIKI KAISHA, Sakai (JP)

(72) Inventors: Tomohiro Kitaura, Sakai (JP); Kota Nakamura, Sakai (JP); Ryunosuke Makino, Sakai (JP); Yuuki Okamoto, Sakai (JP); Osamu Shimizu, Sakai (JP); Hiroshi Mizuno, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 6 days.

(21) Appl. No.: 18/515,590

(22) Filed: Nov. 21, 2023

(65) Prior Publication Data

US 2024/0176216 A1     May 30, 2024

(30) Foreign Application Priority Data

Nov. 25, 2022    (JP) .................... 2022-188311

(51) Int. Cl.
*G03B 17/55* (2021.01)
*H04N 23/54* (2023.01)
*F24C 15/04* (2006.01)

(52) U.S. Cl.
CPC ............. *G03B 17/55* (2013.01); *H04N 23/54* (2023.01); *F24C 15/04* (2013.01)

(58) Field of Classification Search
CPC .......... G03B 17/55; H04N 23/54; F24C 15/04
USPC ....................................................... 348/143
See application file for complete search history.

(56) References Cited

U.S. PATENT DOCUMENTS

| | | | | |
|---|---|---|---|---|
| 6,061,087 | A | * | 5/2000 | Schieltz ........... G08B 13/19619 |
| | | | | 348/151 |
| 11,012,601 | B1 | * | 5/2021 | Yue ......................... H04N 23/57 |
| 2018/0058702 | A1 | * | 3/2018 | Jang ......................... F24C 7/081 |
| 2021/0095864 | A1 | * | 4/2021 | Nakashima ............ F24C 15/006 |
| 2021/0306538 | A1 | * | 9/2021 | Solar ...................... H04N 23/51 |
| 2021/0368082 | A1 | * | 11/2021 | Solar ...................... H04N 23/51 |
| 2022/0120447 | A1 | * | 4/2022 | Herlitzius ............. F24C 15/322 |
| 2022/0294955 | A1 | * | 9/2022 | Yoshida ............... G03B 17/561 |
| 2023/0280639 | A1 | * | 9/2023 | Yamashita .......... H05K 7/20154 |
| | | | | 348/294 |
| 2023/0300436 | A1 | * | 9/2023 | Baker .................... H04N 23/52 |
| | | | | 348/333.06 |
| 2024/0074030 | A1 | * | 2/2024 | Tomimoto ............. H04N 23/52 |
| 2024/0133559 | A1 | * | 4/2024 | Jo ........................... G03B 17/55 |
| 2024/0179389 | A1 | * | 5/2024 | Bentley ................. F24C 15/006 |

FOREIGN PATENT DOCUMENTS

JP     2008-286466 A     11/2008

* cited by examiner

*Primary Examiner* — Matthew David Kim
(74) *Attorney, Agent, or Firm* — ScienBiziP, P.C.

(57) ABSTRACT

An image capturing apparatus is attachable to a heating cooker that heats food. The image capturing apparatus includes an image capturing unit and a blower unit. The image capturing unit is configured to perform image capturing. The blower unit is supported by the heating cooker, the blower unit being freely attachable to and detachable from the heating cooker. The blower unit supports the image capturing unit and disposes the image capturing unit at a position facing the heating cooker. The blower unit is configured to generate an air current that flows through a gap between the heating cooker and the image capturing unit.

5 Claims, 12 Drawing Sheets

IMAGE CAPTURING APPARATUS

CROSS-REFERENCE TO RELATED APPLICATIONS

This application claims the benefit of priority to Japanese Patent Application Number 2022-188311 filed on Nov. 25, 2022. The entire contents of the above-identified application are hereby incorporated by reference.

BACKGROUND

Technical Field

The disclosure relates to an image capturing apparatus.

A heating cooker equipped with an image capturing apparatus has been proposed (see, for example, JP 2008-286466 A). The heating apparatus of JP 2008-286466 A includes an image capturing unit disposed outside a door. The image capturing unit is fixed to a handle that assists in a gripping action for opening and closing the door. The image capturing unit captures an image of the inside of a heating chamber (a cooking chamber) through a viewing window provided on the door.

SUMMARY

However, the window (viewing window) becomes hot during cooking with heat. The surface temperature of the window (glass) may become 100° C. or higher, for example, during oven cooking. Thus, radiant heat from the window (glass) may cause the temperature of an image capturing device included in the image capturing apparatus to exceed the heat resistance temperature of the image capturing device.

The disclosure has been made in view of the above problems and it is an object of the disclosure to provide an image capturing apparatus that can reduce the influence of heat from a heating cooker upon an image capturing device.

According to an aspect of the disclosure, an image capturing apparatus is attachable to a heating cooker that heats food. The image capturing apparatus includes an image capturing unit and a blower unit. The image capturing unit is configured to perform image capturing. The blower unit is supported by the heating cooker, the blower unit being freely attachable to and detachable from the heating cooker. The blower unit supports the image capturing unit and disposes the image capturing unit at a position facing the heating cooker. The blower unit is configured to generate an air current that flows through a gap between the heating cooker and the image capturing unit.

According to the image capturing apparatus of the disclosure, it is possible to reduce the influence of heat from the heating cooker upon the image capturing device.

BRIEF DESCRIPTION OF DRAWINGS

The disclosure will be described with reference to the accompanying drawings, wherein like numbers reference like elements.

DESCRIPTION OF EMBODIMENTS

Figure 1:
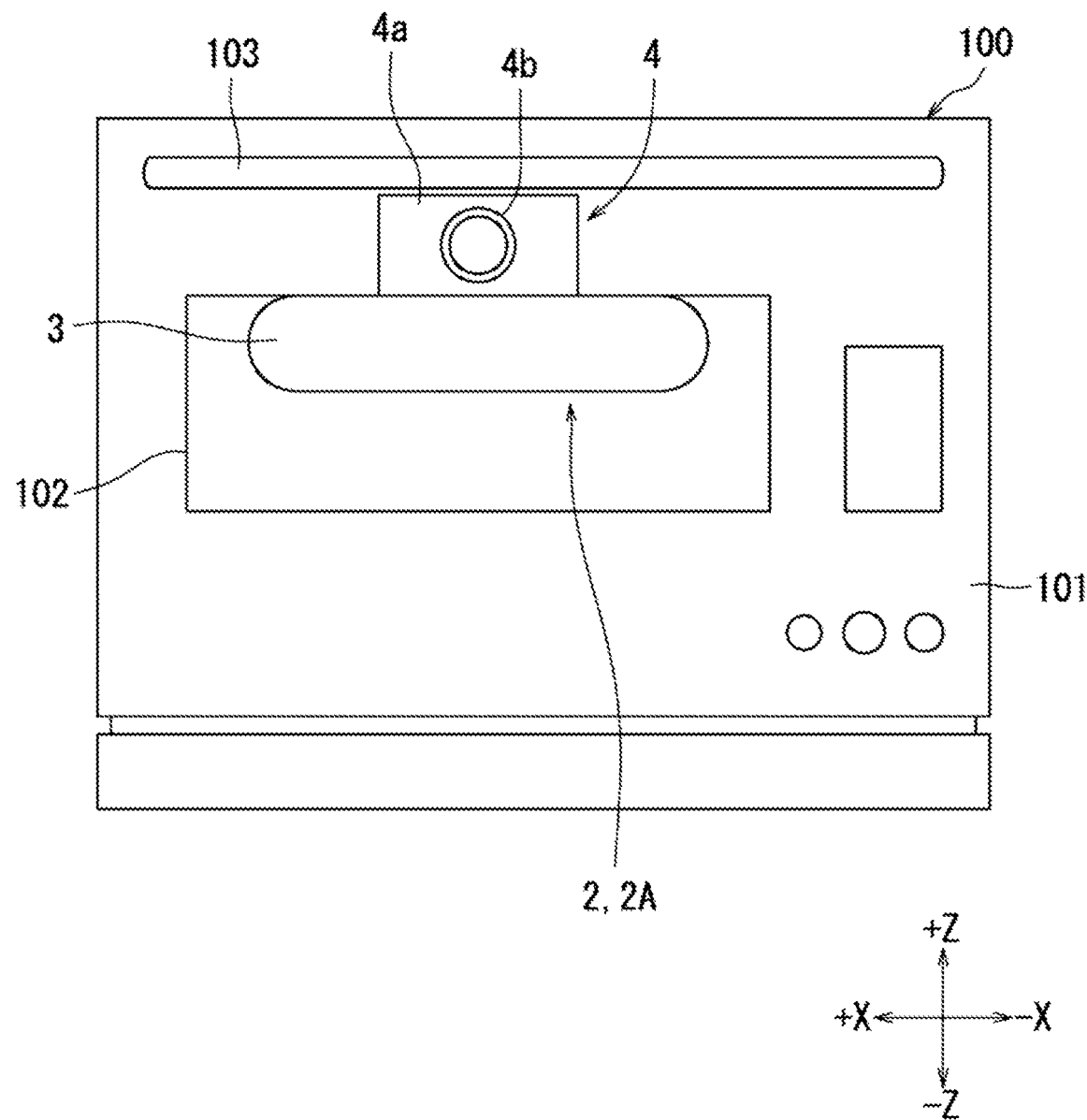
FIG. 1 is a front view illustrating a heating cooker to which an image capturing apparatus according to a first embodiment of the disclosure is temporarily fixed.

Embodiments of an image capturing apparatus of the disclosure will be described below with reference to the drawings (FIGS. 1 to 9B). However, the disclosure is not limited to the following embodiments and can be embodied in various modes without departing from the spirit of the disclosure. Redundant description may be omitted as appropriate. In the drawings, the same or corresponding parts are denoted by the same reference numerals and description thereof will not be repeated.

An X direction, a Y direction, and a Z direction orthogonal to each other are defined herein to facilitate understanding. The X direction includes a +X direction and a −X direction. The Y direction includes a +Y direction and a −Y direction. The Z direction includes a +Z direction and a −Z direction. In the present embodiment, the right side as viewed from the front of a heating cooker 100 is the −X side and the left side is the +X side (see FIG. 1). The front side of the heating cooker 100 is the +Y side and the rear side is the −Y side (see FIG. 2). The upper side of the heating cooker 100 is the +Z side and the lower side is the −Z side (see FIG. 1). The front side of the heating cooker 100 is the side of the heating cooker 100 on which a door 101 is disposed. A side of the heating cooker 100 opposite the side on which the door 101 is disposed is the rear side of the heating cooker 100. An upper side in the vertical direction when the heating cooker 100 is installed on a horizontal surface is the upper side of the heating cooker 100 and a lower side in the vertical direction when the heating cooker 100 is installed on the horizontal surface is the lower side of the heating cooker 100.

First Embodiment

Figure 2:
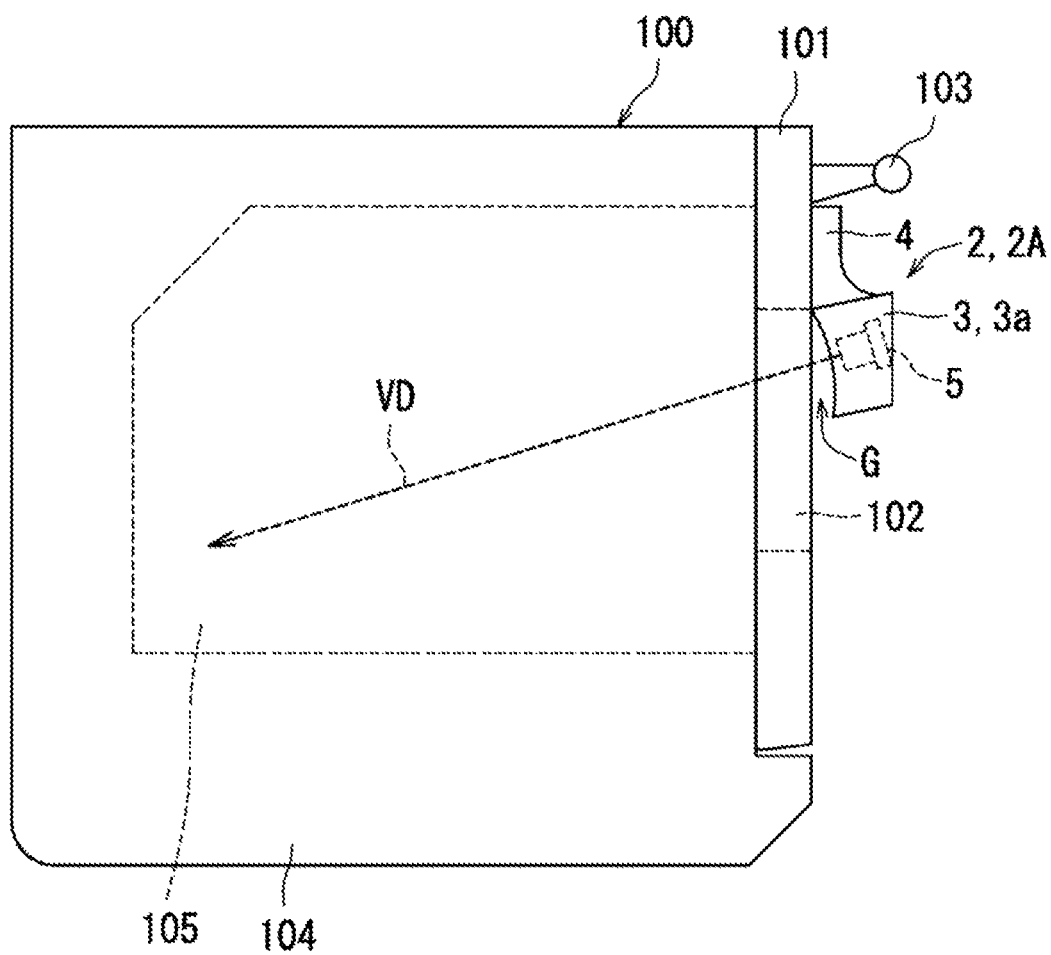
FIG. 2 is a side view illustrating the heating cooker to which the image capturing apparatus according to the first embodiment of the disclosure is temporarily fixed.

First, a first embodiment of the disclosure will be described with reference to FIGS. 1 to 7. FIG. 1 is a front view illustrating the heating cooker 100 to which an image capturing apparatus 2 of the present embodiment is temporarily fixed. FIG. 2 is a side view illustrating the heating cooker 100 to which the image capturing apparatus 2 of the present embodiment is temporarily fixed. Hereinafter, the image capturing apparatus 2 according to the first embodiment may be referred to as an "image capturing apparatus 2A".

The heating cooker 100 cooks food with heat. Specifically, as illustrated in FIGS. 1 and 2, the heating cooker 100 includes the door 101, a window 102, a handle 103, and a main body 104 (see FIG. 2). The main body 104 includes a cooking chamber 105 (see FIG. 2). The cooking chamber 105 is provided inside the main body 104. The internal space of the cooking chamber 105 is a cooking space in which food is heated. The main body 104 cooks food placed in the cooking chamber 105 (the cooking space) with heat. The heating cooker 100 is, for example, a toaster, an oven, a microwave oven, or a convection microwave oven.

As illustrated in FIG. 2, the door 101 is disposed on the front side (+Y side) of the main body 104. The door 101 is attached to the main body 104 such that the door 101 can be freely opened and closed. In the example illustrated in FIGS. 1 and 2, the door 101 is supported by the main body 104 such that the door 101 is rotatable vertically (in the Z direction). The handle 103 is provided on the door 101. In the example illustrated in FIGS. 1 and 2, the handle 103 is disposed above (on the +Z side of) the window 102. The door 101 may also be supported by the main body 104 such that the door 101 is laterally rotatable. In this case, the handle 103 is disposed on the +X side or the −X side of the window 102.

The window 102 is disposed on the main body 104. In the present embodiment, the window 102 is provided in the door 101. That is, the window 102 is disposed on the main body 104 through the door 101. The window 102 makes the cooking chamber 105 (the cooking space) visible from the outside of the heating cooker 100. The window 102 includes glass. The front surface (+Y side surface) of the window 102 is a glass surface.

The image capturing apparatus 2A can be attached to the heating cooker 100. The image capturing apparatus 2A of the present embodiment is temporarily fixed to an outer wall surface of the door 101 and captures an image of the cooking chamber 105 (the cooking space) through the window 102. Thus, the image capturing apparatus 2A can capture an image of how food is cooked with heat in the cooking chamber 105 (the cooking space). Specifically, the image capturing apparatus 2A captures a moving image. The image capturing apparatus 2A may also capture a still image. For example, the user can capture an image of how food is cooked with heat by the heating cooker 100 using the image capturing apparatus 2 and upload the captured moving or still image to a social networking service (SNS).

More specifically, the image capturing apparatus 2A includes an image capturing unit 3 and a blower unit 4 as illustrated in FIG. 1. The blower unit 4 is supported by the heating cooker 100 such that the blower unit 4 is freely attachable to and detachable from the heating cooker 100. In the present embodiment, the blower unit 4 is supported by the door 101. More specifically, the blower unit 4 is attached above the window 102. The blower unit 4 supports the image capturing unit 3 and disposes the image capturing unit 3 at a position facing the heating cooker 100. In the present embodiment, the image capturing unit 3 is connected to a lower surface (a −Z-side surface) of the blower unit 4. The blower unit 4 causes the image capturing unit 3 to face the window 102.

The image capturing unit 3 performs image capturing. Specifically, with the image capturing unit 3 being supported by the blower unit 4, the image capturing unit 3 faces the window 102 and captures an image of the cooking chamber 105 (see FIG. 2) through the window 102.

Specifically, the image capturing unit 3 includes a housing 3a and an image capturing device 5 as illustrated in FIG. 2. The housing 3a accommodates the image capturing device 5. The image capturing device 5 performs image capturing. In the present embodiment, the blower unit 4 supports the image capturing unit 3 such that a viewing direction VD of the image capturing device 5 is obliquely downward.

Figure 3:
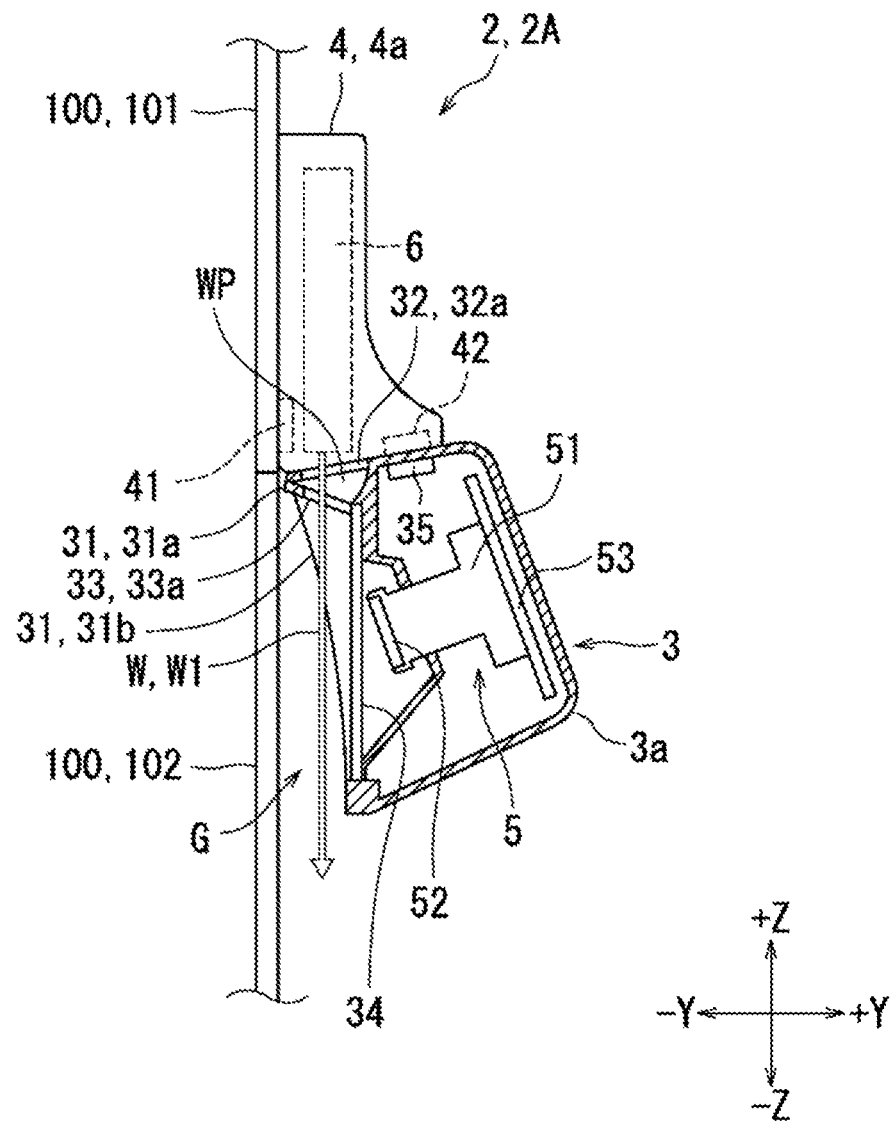
FIG. 3 is a view illustrating a configuration of the image capturing apparatus according to the first embodiment of the disclosure.

Next, the image capturing apparatus 2A of the present embodiment will be described with reference to FIGS. 1 to 3 and 5. FIG. 3 is a view illustrating a configuration of the image capturing apparatus 2A of the present embodiment. Specifically, FIG. 3 illustrates the image capturing apparatus 2A temporarily fixed to the door 101 of the heating cooker 100. FIG. 3 illustrates a cross section of the image capturing unit 3.

As illustrated in FIG. 3, the blower unit 4 generates an air current W that flows through a gap G between the heating cooker 100 and the image capturing unit 3. More specifically, the blower unit 4 generates an air current W that flows through the gap G between the window 102 and the image capturing unit 3.

Specifically, the image capturing unit 3 further includes a cover 34. The cover 34 is disposed at a front surface (a surface on the −Y side) of the housing 3a. The cover 34 is colorless and transparent. The cover 34 is made of, for example, glass. Alternatively, the cover 34 may be made of a colorless and transparent heat-resistant resin. The cover 34 faces the window 102 with the blower unit 4 being attached to the door 101. The blower unit 4 generates the air current W that flows through the gap G between the window 102 and the cover 34.

The blower unit 4 includes a housing 4a and a blower device 6. The housing 4a accommodates the blower device 6. The blower device 6 generates an air current. Hereinafter, an air current generated by the blower device 6 may be referred to as a "first air current W1". An air current generated by the blower unit 4 may also be referred to as a "first air current W1".

As illustrated in FIG. 1, a suction port 4b is formed at a rear surface (a surface on the +Y side) of the housing 4a. An opening (not illustrated) is formed in a lower surface (a −Z-side surface) of the housing 4a. When the blower device 6 is driven, air outside the image capturing apparatus 2A flows into the housing 4a through the suction port 4b and is sucked into the blower device 6. The air sucked into the blower device 6 is blown downward (in the −Z direction) from the blower device 6. As a result, a first air current W1 is generated that flows downward (in the −Z direction) from the lower surface of the blower unit 4 (the housing 4a). The blower device 6 is, for example, a sirocco fan.

The image capturing unit 3 includes an upper wall 31a that contacts the blower unit 4. Specifically, the image capturing unit 3 further includes a front collar 31. The front collar 31 includes the upper wall 31a. The upper wall 31a protrudes from an upper end portion of the housing 3a to the −Y side with the image capturing apparatus 2A being attached to the door 101. The upper wall 31a contacts the lower surface of the housing 4a of the blower unit 4 with the image capturing unit 3 being supported by the blower unit 4.

Figure 5:
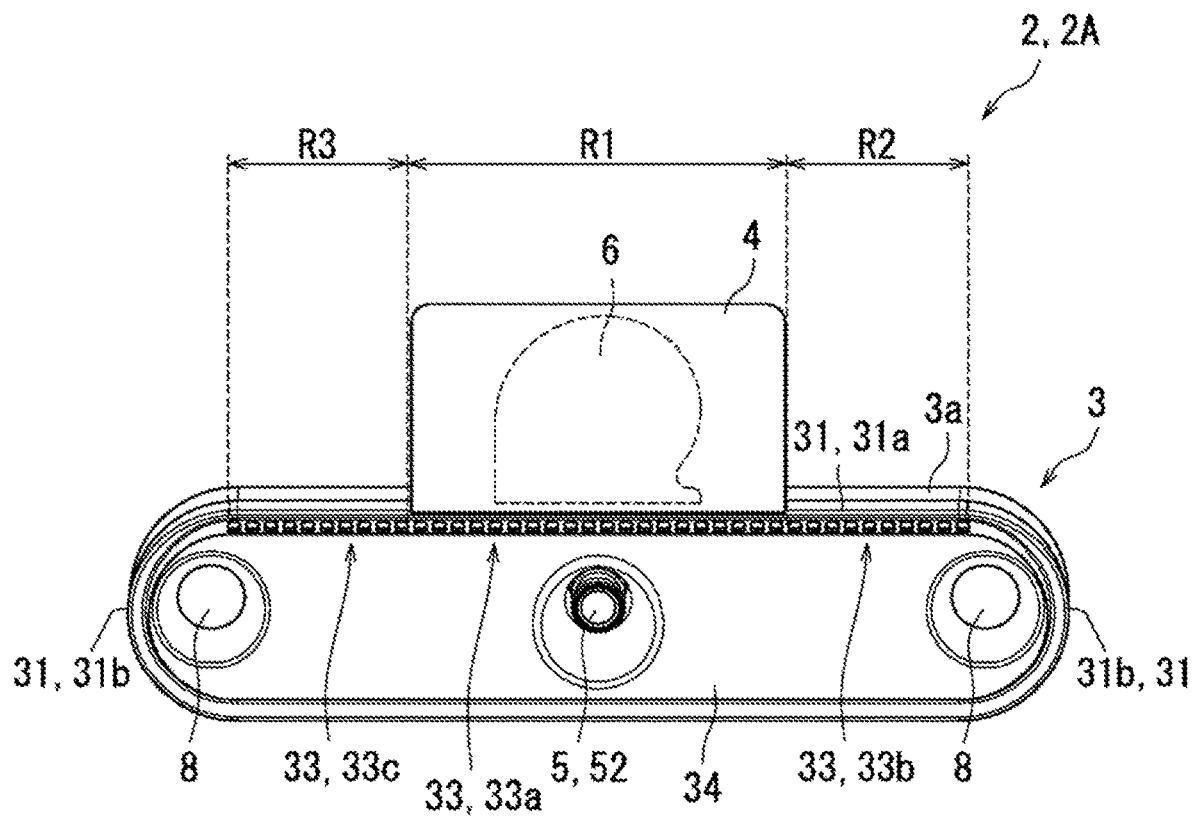
FIG. 5 is a front view of the image capturing apparatus according to the first embodiment of the disclosure.

Here, the front collar 31 will be described with reference to FIGS. 3 and 5. FIG. 5 is a front view of the image capturing apparatus 2A of the present embodiment. As illustrated in FIG. 3, the front collar 31 protrudes from the housing 3a to the −Y side. Specifically, the front collar 31 protrudes from the housing 3a toward the window 102 with the blower unit 4 being attached to the door 101.

As illustrated in FIG. 5, the front collar 31 surrounds the cover 34. Specifically, the front collar 31 further includes two side walls 31b in addition to the upper wall 31a. One of the two side walls 31b extends downward (in the −Z direction) from a +X-side end portion of the upper wall 31a. The other of the two side walls 31b extends downward (in the −Z direction) from a −X-side end portion of the upper wall 31a. The upper wall 31a and the two side walls 31b are provided along an edge of the housing 3a when viewed from the front (−Y side) of the image capturing unit 3.

As illustrated in FIG. 3, the distance between a distal end (a −Y-side end) of the side wall 31b and the housing 3a decreases toward the −Z side. That is, the height of the side wall 31b from the housing 3a decreases toward the −Z side. Namely, the distal end (the −Y-side end) of the side wall 31b becomes closer to the housing 3a toward the −Z side. For example, the −Z-side end of the side wall 31b may be flush with the housing 3a. As illustrated in FIGS. 3 and 5, the front collar 31 is not provided at a lower end portion (a −Z-side end portion) of the housing 3a. Thus, the space between −Z-side end portions of the two side walls 31b are open.

Reference will be made back to the upper wall 31a. As illustrated in FIG. 3, the upper wall 31a includes inflow ports 32 and outflow ports 33. The outflow ports 33 are located below (on the −Z side of) the inflow ports 32 with the image capturing apparatus 2A being attached to the door 101. Specifically, the inflow ports 32 open at an upper surface (a +Z-side surface) of the upper wall 31a. The outflow ports 33 open at a lower surface (a −Z-side surface) of the upper wall 31a. The outflow ports 33 communicate with the gap G between the window 102 and the cover 34 with the image capturing apparatus 2A being attached to the door 101. An air passage WP that allows the inflow ports 32 and the outflow ports 33 to communicate with each other is formed inside the upper wall 31a. That is, the upper wall 31a includes the air passage WP. The inflow ports 32 are inlets of the air passage WP and the outflow ports 33 are outlets of the air passage WP. Specifically, the inside of the front collar 31 is hollow.

In the present embodiment, the inflow ports 32 include first inflow ports 32a. The outflow ports 33 include first outflow ports 33a. The first inflow ports 32a communicate with an opening formed in the lower surface of the housing 4a of the blower unit 4. The first outflow ports 33a are located below (on the −Z side of) the first inflow ports 32a with the image capturing apparatus 2A being attached to the door 101. Namely, the positions where the first inflow ports 32a are provided and the positions where the first outflow ports 33a are provided face each other in the Z direction.

A first air current W1 flows into the first inflow ports 32a. The first air current W1 that has flowed into the first inflow ports 32a is blown mainly out of the first outflow ports 33a and flows through the gap G between the window 102 and the cover 34. Specifically, the air current W (the first air current W1) generated by the blower unit 4 flows into the inside (the air passage WP) of the upper wall 31a through the first inflow ports 32a. The first air current W1 that has flowed into the inside (the air passage WP) of the upper wall 31a flows through the inside (the air passage WP) of the upper wall 31a and is blown downward mainly out of the first outflow ports 33a. As a result, the first air current W1 flows downward (in the −Z direction) through the gap G between the window 102 and the cover 34.

The front collar 31 is not provided at the lower end portion of the housing 3a as described with reference to FIGS. 3 and 5. Thus, the first air current W1 flows downward of the image capturing unit 3 through the gap G between the window 102 and the cover 34.

Next, the image capturing unit 3 will be further described with reference to FIG. 3. As illustrated in FIG. 3, the image capturing device 5 includes a camera body 51, a lens 52, and a camera board 53. The camera body 51 includes an image capturing element. The camera board 53 includes a circuit board and electronic components mounted on the circuit board. The camera board 53 drives the image capturing element of the camera body 51. The image capturing element performs image capturing by the camera board 53 driving the image capturing element. The image capturing element includes, for example, a charge coupled device (CCD) image sensor or a complementary metal oxide semiconductor (CMOS) image sensor. The lens 52 adjusts the focal length of the image capturing element.

The heating cooker 100 cooks food with heat as described with reference to FIG. 1. The temperature of the surface (glass surface) of the window 102 may become high during cooking food with heat. For example, the surface temperature of window 102 may become 100° C. or higher. Thus, the temperature of the image capturing device 5 may exceed the heat resistance temperature of the image capturing device 5 due to radiant heat from the window 102. Specifically, the temperature of the camera body 51 may exceed the heat resistance temperature of the camera body 51. Similarly, the temperature of the camera board 53 may exceed the heat resistance temperature of the camera board 53. If the lens 52 is a plastic lens, the temperature of the lens 52 may exceed the heat resistance temperature of the plastic lens. For example, the heat resistance temperature of the camera board 53 is 80° C. The heat resistance temperature of the camera body 51 is 60° C. The heat resistance temperature of the plastic lens is 60° C.

In contrast, according to the present embodiment, it is possible to generate an air current W that flows through the gap G between the window 102 and the image capturing unit 3. As a result, the air current W can cool radiant heat generated from the window 102. The air current W also makes it difficult for radiant heat from the window 102 to be transferred to the image capturing device 5. Thus, according to the present embodiment, it is possible to reduce the influence of heat from the heating cooker 100 upon the image capturing device 5. As a result, it is possible to prevent the temperature of the image capturing device 5 from exceeding the heat resistance temperature of the image capturing device 5.

Next, the image capturing apparatus 2A of the present embodiment will be further described with reference to FIG. 3. In the present embodiment, the image capturing unit 3 is freely attachable to and detachable from the blower unit 4. Specifically, the image capturing unit 3 further includes a magnet 35 as illustrated in FIG. 3. The blower unit 4 also further includes a magnet 42. The magnet 35 is disposed inside the housing 3a of the image capturing unit 3. The magnet 42 is disposed inside the housing 4a of the blower unit 4. Specifically, the magnet 35 is fixed to an inner wall surface of an upper wall (a +Z side wall) of the housing 3a. The magnet 42 is fixed to an inner wall surface of a lower wall (a −Z side wall) of the housing 4a. As a result, bringing the image capturing unit 3 into contact with the lower surface of the blower unit 4 attaches the image capturing unit 3 to the blower unit 4 due to attraction between the magnet 35 of the image capturing unit 3 and the magnet 42 of the blower unit 4.

According to the present embodiment, the image capturing unit 3 is freely attachable to and detachable from the blower unit 4, and thus the image capturing unit 3 can be detached from the blower unit 4 for use. Thus, for example, the image capturing unit 3 can be used to capture an image of how food is cooked on a cutting board or capture an image of how food is cooked using a frying pan or a pot.

Moreover, according to the present embodiment, it is necessary to provide the housing 3a of the image capturing unit 3 with neither air inflow ports nor air discharge ports. This can improve the waterproof performance of the housing 3a. Thus, for example, it is possible to prevent moisture from entering the housing 3a when the image capturing unit 3 captures an image of how food is cooked on a cutting board.

Further, according to the present embodiment, the work of attaching the image capturing unit 3 to the blower unit 4 and the work of detaching the image capturing unit 3 from the blower unit 4 are facilitated because the magnets 35 and 42 are used.

Figure 4:
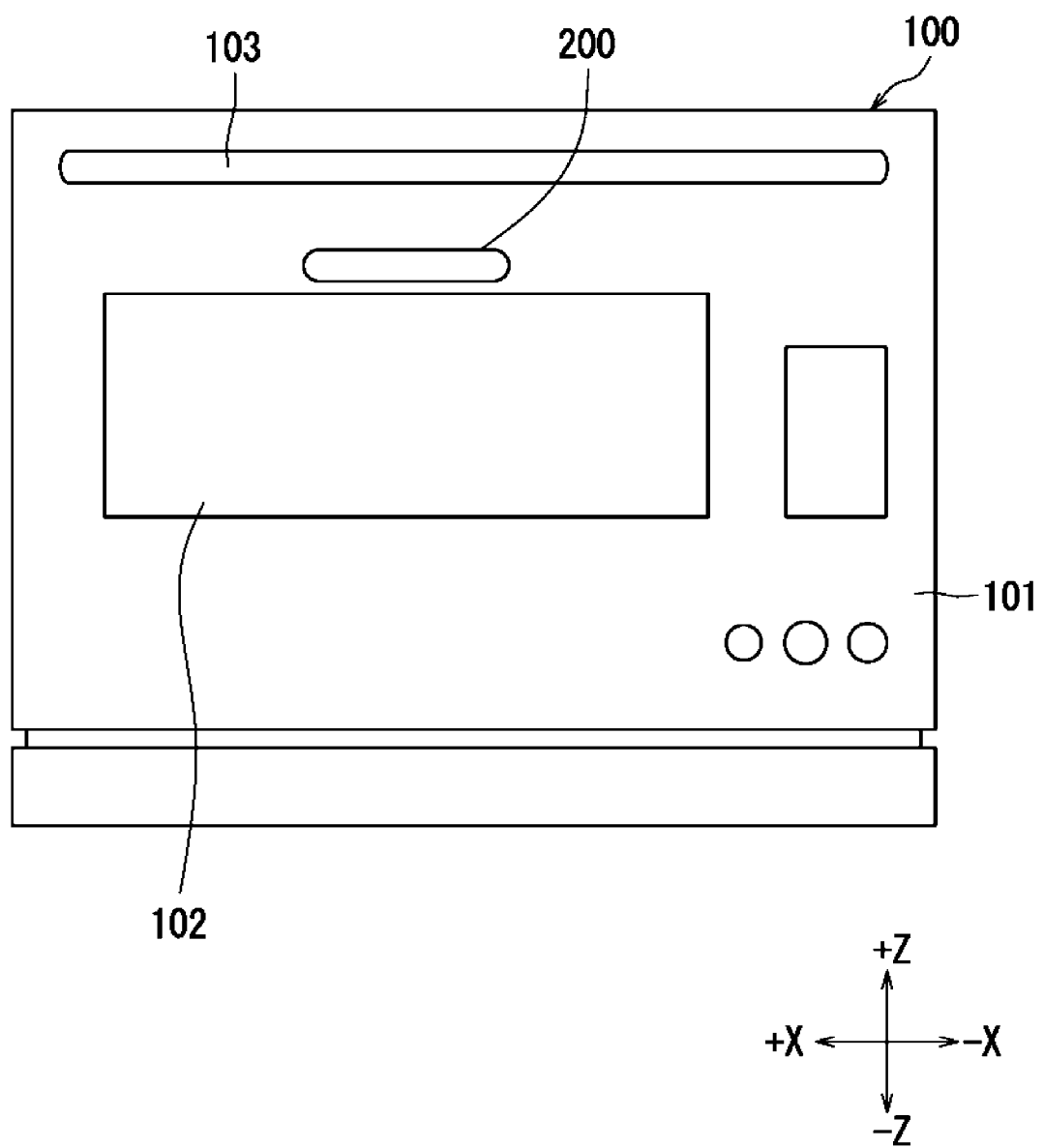
FIG. 4 is a front view of the heating cooker to which the image capturing apparatus according to the first embodiment of the disclosure is to be attached.

Next, the image capturing apparatus 2A of the present embodiment will be described with reference to FIGS. 3 and 4. FIG. 4 is a front view of the heating cooker 100 to which the image capturing apparatus 2A of the present embodiment is to be attached.

The blower unit 4 further includes a magnet 41 as illustrated in FIG. 3. The magnet 41 is disposed inside the housing 4a. More specifically, the magnet 41 is fixed to an inner wall surface of a front wall (a −Y side wall) of the housing 4a. On the other hand, a ferromagnetic body 200 is fixed to the door 101 of the heating cooker 100 as illustrated in FIG. 4. Specifically, the ferromagnetic body 200 is fixed to a front surface (a +Y side surface) of the door 101. As a result, bringing the blower unit 4 into contact with the ferromagnetic body 200 attaches the blower unit 4 to the door 101 of the heating cooker 100 due to attraction between the magnet 41 of the blower unit 4 and the ferromagnetic body 200.

According to the present embodiment, the blower unit 4 can be detached from the heating cooker 100 because the blower unit 4 is freely attachable to and detachable from the heating cooker 100. Thus, the image capturing apparatus 2A can be used for other cooking apparatuses.

Moreover, according to the present embodiment, the work of attaching the blower unit 4 to the heating cooker 100 and the work of detaching the blower unit 4 from the heating cooker 100 are facilitated because the magnet 41 is used.

Next, the image capturing apparatus 2A of the present embodiment will be described with reference to FIG. 5. As illustrated in FIG. 5, the image capturing unit 3 further includes two lighting units 8. The two lighting units 8 each project light to the field of view of the image capturing device 5. Each lighting unit 8 includes a light-emitting element such as, for example, a light-emitting diode (LED). The lighting unit 8 emits light by the light-emitting element emitting light. According to the present embodiment, the lighting units 8 can brightly illuminate the cooking chamber 105 (the cooking space) described with reference to FIG. 2. Thus, the lighting units 8 can turn the cooking chamber 105 (the cooking space) into an environment suitable for capturing an image by the image capturing unit 3.

Figure 6:
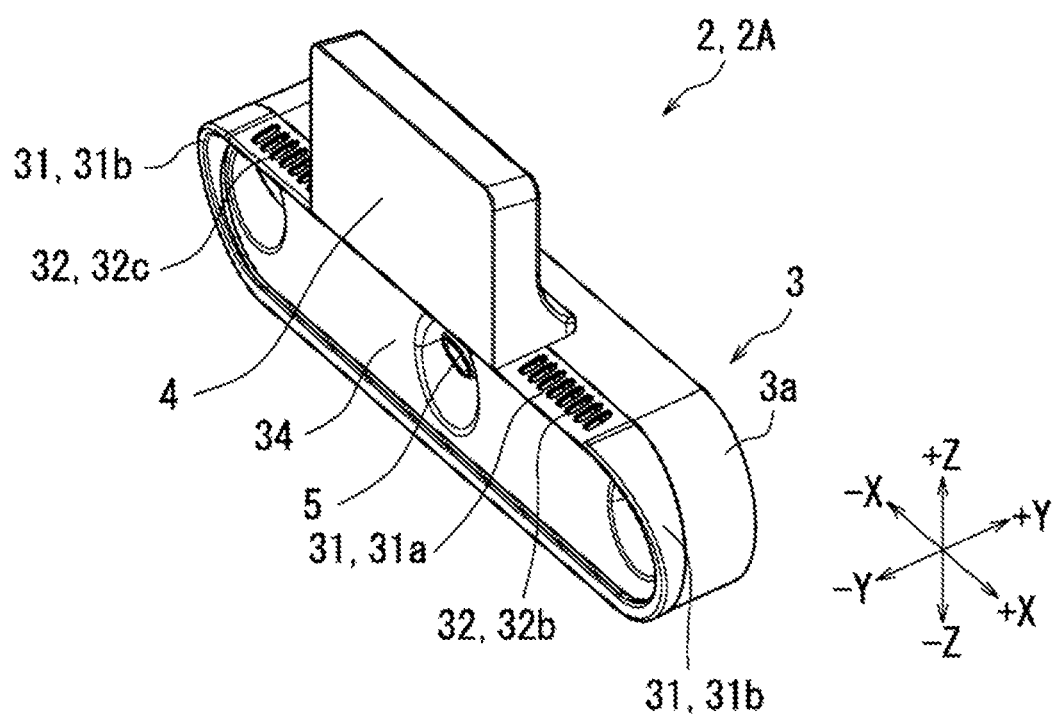
FIG. 6 is a perspective view illustrating the image capturing apparatus according to the first embodiment of the disclosure.

Next, the image capturing apparatus 2A of the present embodiment will be described with reference to FIGS. 5 and 6. FIG. 6 is a perspective view illustrating the image capturing apparatus 2A of the present embodiment. Specifically, FIG. 6 illustrates the image capturing apparatus 2A viewed obliquely from above.

As illustrated in FIG. 5, the upper wall 31a includes a plurality of the outflow ports 33. The plurality of outflow ports 33 are arranged in the direction in which the upper wall 31a extends. The upper wall 31a extends in the X direction.

The upper wall 31a includes a first region R1. The plurality of outflow ports 33 include a plurality of the first outflow ports 33a. The plurality of first outflow ports 33a are formed in the first region R1. The first region R1 indicates a contact region where the upper wall 31a and the lower surface (the −Z side surface) of the blower unit 4 (the housing 4a) contact each other. The first outflow ports 33a have been described with reference to FIG. 3 and thus detailed description thereof will be omitted here.

The upper wall 31a further includes a second region R2 and a third region R3. The plurality of outflow ports 33 also further includes a plurality of second outflow ports 33b and a plurality of third outflow ports 33c. The plurality of second outflow ports 33b are formed in the second region R2. The plurality of third outflow ports 33c are formed in the third region R3. The second region R2 and the third region R3 indicate regions outside the first region R1. Specifically, the second region R2 and the third region R3 are non-contact regions where the upper wall 31a does not contact the lower surface (the −Z-side surface) of the blower unit 4 (the housing 4a). Specifically, the second region R2 is a region on the +X side of the first region R1. The third region R3 is a region on the −X side of the first region R1.

As illustrated in FIG. 6, the inflow ports 32 further include a plurality of second inflow ports 32b and a plurality of third inflow ports 32c in addition to the first inflow ports 32a described with reference to FIG. 3. The first inflow ports 32a described with reference to FIG. 3 are formed in the first region R1 illustrated in FIG. 5. The inflow ports 32 may include one first inflow port 32a or may include a plurality of the first inflow ports 32a arranged in the X direction. When the inflow ports 32 include one first inflow port 32a, the first inflow port 32a may have a shape extending in the X direction. The first inflow ports 32a have been described with reference to FIG. 3 and thus detailed description thereof will be omitted here.

The plurality of second inflow ports 32b are formed in the second region R2 illustrated in FIG. 5. The plurality of second inflow ports 32b are arranged in the X direction. Each of the second inflow ports 32b communicates with the space outside the image capturing apparatus 2A. The plurality of second inflow ports 32b are located above (on the +Z side of) the plurality of second outflow ports 33b illustrated in FIG. 5 with the image capturing apparatus 2A being attached to the door 101. Namely, the positions where the plurality of second inflow ports 32b are provided and the positions where the plurality of second outflow ports 33b are provided face each other in the Z direction.

The plurality of third inflow ports 32c are formed in the third region R3 illustrated in FIG. 5. The plurality of third inflow ports 32c are arranged in the X direction. Each of the third inflow ports 32c communicates with the space outside the image capturing apparatus 2A. The relationship between the plurality of third inflow ports 32c and the plurality of third outflow ports 33c illustrated in FIG. 5 is the same as the relationship between the plurality of second inflow ports 32b and the plurality of second outflow ports 33b and thus description thereof will be omitted.

Figure 7:
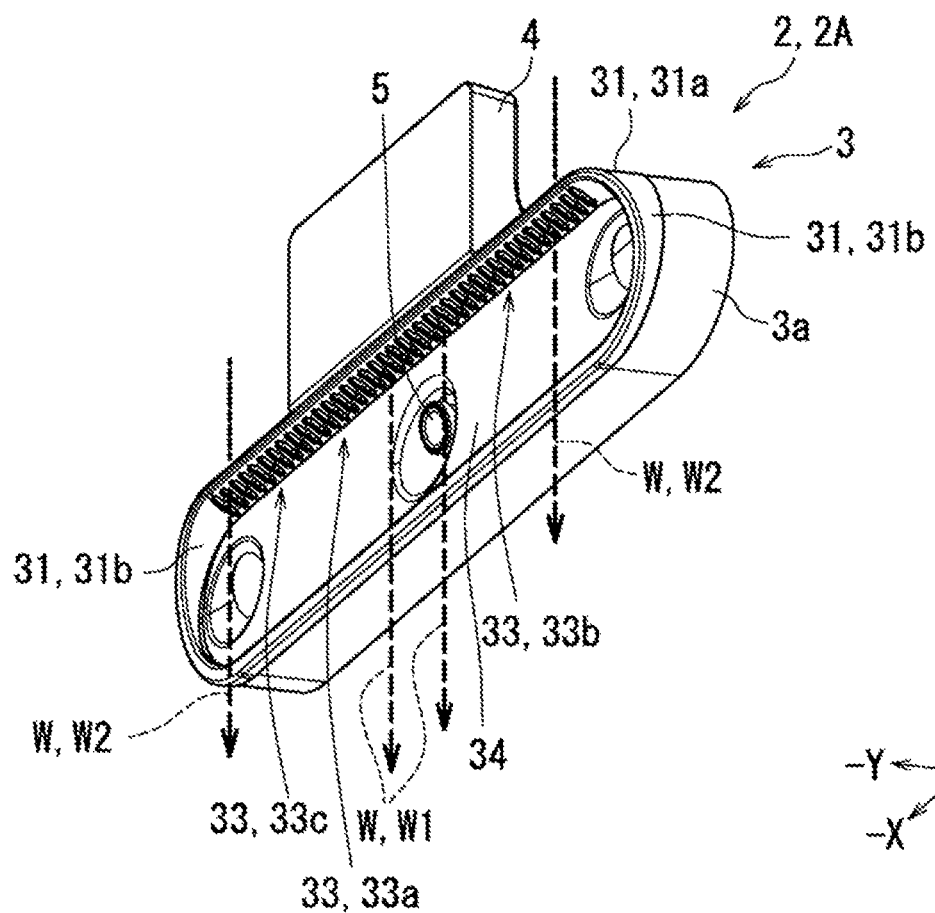
FIG. 7 is another perspective view illustrating the image capturing apparatus according to the first embodiment of the disclosure.

Next, the image capturing apparatus 2A of the present embodiment will be described with reference to FIGS. 3 and 5 to 7. FIG. 7 is another perspective view illustrating the image capturing apparatus 2A of the present embodiment. Specifically, FIG. 7 illustrates the image capturing apparatus 2A viewed obliquely from below.

The blower unit 4 generates the first air current W1 as described with reference to FIG. 3. The first air current W1 flows into the first inflow ports 32a of the upper wall 31a, flows through the inside (the air passage WP) of the upper wall 31a, and is blown mainly out of the first outflow ports 33a. That is, the first air current W1 mainly flows through the air passage WP in the first region R1 (see FIG. 5). Hereinafter, the air passage WP in the first region R1 may be referred to as a "first air passage WP1". The first air passage WP1 indicates a portion of the internal space of the upper wall 31a in the first region R1.

The first air current W1 flowing through the first air passage WP1 is blown out of the first outflow ports 33a toward the gap G between the window 102 and the cover 34. Namely, the first air current W1 flows from the blower unit 4 into the first air passage WP1 and the first air current W1 flowing through the first air passage WP1 is blown out of the first air passage WP1 toward the gap G between the window 102 of the heating cooker 100 and the cover 34 of the image capturing unit 3.

As illustrated in FIG. 7, the first air current W1 blown out of the first outflow ports 33a passes in front of the image capturing device 5. Thus, the influence of heat from the heating cooker 100 upon the image capturing device 5 can be reduced as described with reference to FIG. 3.

When the first air current W1 is blown out of the first outflow ports 33a, the first air current W1 flowing through the gap G between the window 102 and the cover 34 generates a suction force at the second outflow ports 33b and the third outflow ports 33c. Specifically, when a current of air (the first air current W1) directed downward (in the −Z direction) from the first outflow ports 33a is generated, air around a region where the current of air is generated also flows downward. As a result, a suction force is generated at the second outflow ports 33b and the third outflow ports 33c.

When a suction force is generated at the second outflow ports 33b and the third outflow ports 33c, the air outside the image capturing apparatus 2A flows into the second inflow ports 32b and the third inflow ports 32c illustrated in FIG. 6, passes through the inside (the air passage WP) of the upper wall 31a, and is blown mainly out of the second outflow ports 33b and the third outflow ports 33c. As a result, second air currents W2 are generated as illustrated in FIG. 7.

Specifically, the second air currents W2 mainly flow through the air passages WP in the second region R2 (see FIG. 5) and the third region R3 (see FIG. 5). Hereinafter, the air passage WP in the second region R2 may be referred to as a "second air passage WP2". Also, the air passage WP in the third region R3 may be referred to as a "third air passage WP3". The second air passage WP2 indicates a portion of the internal space of the upper wall 31a in the second region R2. Similarly, the third air passage WP3 indicates a portion of the internal space of the upper wall 31a in the third region R3.

As illustrated in FIG. 7, the second air current W2 flowing through the second air passage WP2 is blown out of the second outflow ports 33b toward the gap G between the window 102 and the cover 34. That is, the air outside the image capturing apparatus 2A flows into the second air passage WP2 to generate a second air current W2 and the second air current W2 flowing through the second air passage WP2 is blown out of the second air passage WP2 toward the gap G between the window 102 of the heating cooker 100 and the cover 34 of the image capturing unit 3.

Similarly, the second air current W2 flowing through the third air passage WP3 is blown out of the third outflow ports 33c toward the gap G between the window 102 and the cover 34. That is, the air outside the image capturing apparatus 2A flows into the third air passage WP3 to generate a second air current W2 and the second air current W2 flowing through the third air passage WP3 is blown out of the third air passage WP3 toward the gap G between the window 102 of the heating cooker 100 and the cover 34 of the image capturing unit 3.

According to the present embodiment, air currents W flow into the gap G between the heating cooker 100 and the image capturing unit 3 from the first to third regions R1 to R3 as described above with reference to FIG. 3 and FIG. 5 to FIG. 7. Thus, it is possible to further limit the temperature rise of the image capturing unit 3 due to radiant heat from the window 102 because air currents W can be generated in a wider range.

Further, according to the present embodiment, air currents W passing in front of the two lighting units 8 are generated because air currents W flow into the gap G between the heating cooker 100 and the image capturing unit 3 from the first to third regions R1 to R3. Thus, it is possible to limit the temperature rise of the lighting units 8 due to radiant heat from the window 102. Thus, it is possible to reduce the influence of heat from the heating cooker 100 upon the lighting units 8. As a result, it is possible to prevent the temperature of the lighting units 8 from exceeding the heat resistance temperature of the lighting units 8.

Although the inside of the upper wall 31a is hollow in the present embodiment, a plurality of through holes may be formed inside the upper wall 31a. Each of the through holes extends in the Z direction with the image capturing apparatus 2A being attached to the heating cooker 100. One end of each through hole communicates with a corresponding inflow port 32 and the other end of each through hole communicates with a corresponding outflow port 33. In this case, through holes located in the first region R1 form the first air passage WP1. Through holes located in the second region R2 form the second air passage WP2. Through holes located in the third region R3 form the third air passage WP3. Namely, through holes communicating with the first inflow ports 32a and the first outflow ports 33a form the first air passage WP1. Through holes communicating with the second inflow ports 32b and the second outflow ports 33b form the second air passage WP2. Through holes communicating with the third inflow ports 32c and the third outflow ports 33c form the third air passage WP3.

Second Embodiment

Next, a second embodiment of the disclosure will be described with reference to FIGS. 8A to 8C. Matters different from those of the first embodiment will be described and description of the same matters as those of the first embodiment will be omitted. The second embodiment differs from the first embodiment in that the image capturing unit 3 includes an air current disperser 9. Hereinafter, the image capturing apparatus 2 according to the second embodiment may be referred to as an "image capturing apparatus 2B".

Figure 8A:
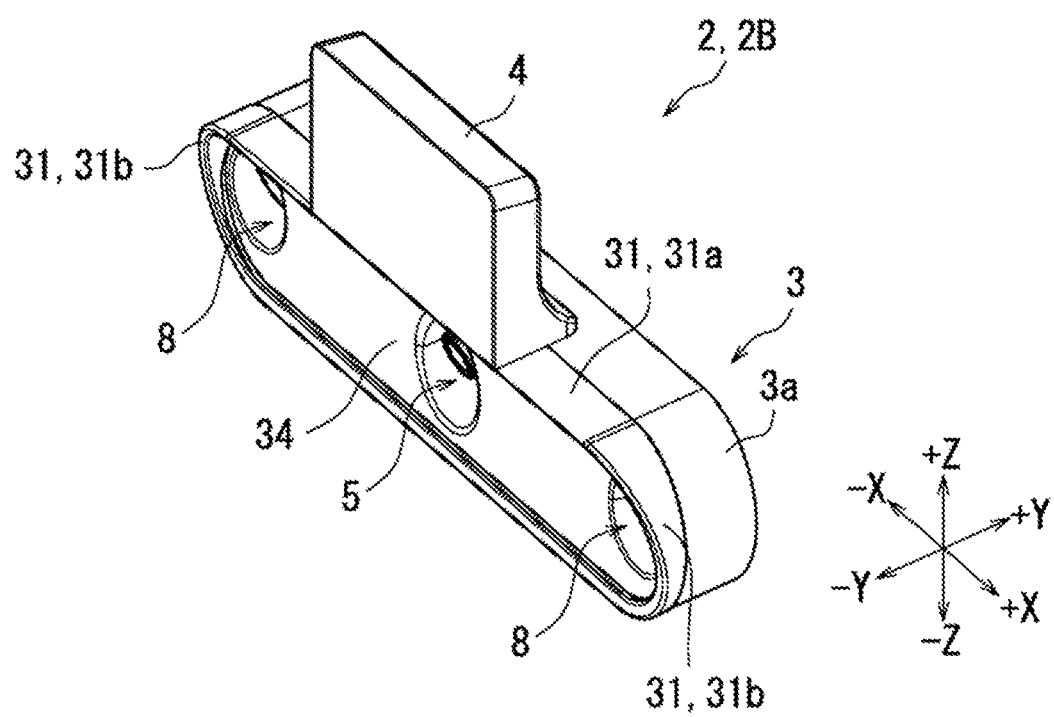
FIG. 8A is a perspective view illustrating an image capturing apparatus according to a second embodiment of the disclosure.

FIG. 8A is a perspective view illustrating the image capturing apparatus 2B of the present embodiment. Specifically, FIG. 8A illustrates the image capturing apparatus 2B viewed obliquely from above. FIG. 8B is another perspective view illustrating the image capturing apparatus 2B of the present embodiment. Specifically, FIG. 8B illustrates the image capturing apparatus 2B viewed obliquely from below.

As illustrated in FIG. 8A, the upper wall 31a of the image capturing apparatus 2B does not include the second inflow ports 32b and the third inflow ports 32c described in the first embodiment. As illustrated in FIG. 8B, the image capturing unit 3 includes the air current disperser 9. The air current disperser 9 is disposed in the gap G (see FIG. 3) between the window 102 of the heating cooker 100 and the cover 34 of the image capturing unit 3 to disperse an air current W generated by the blower unit 4.

Figure 8B:
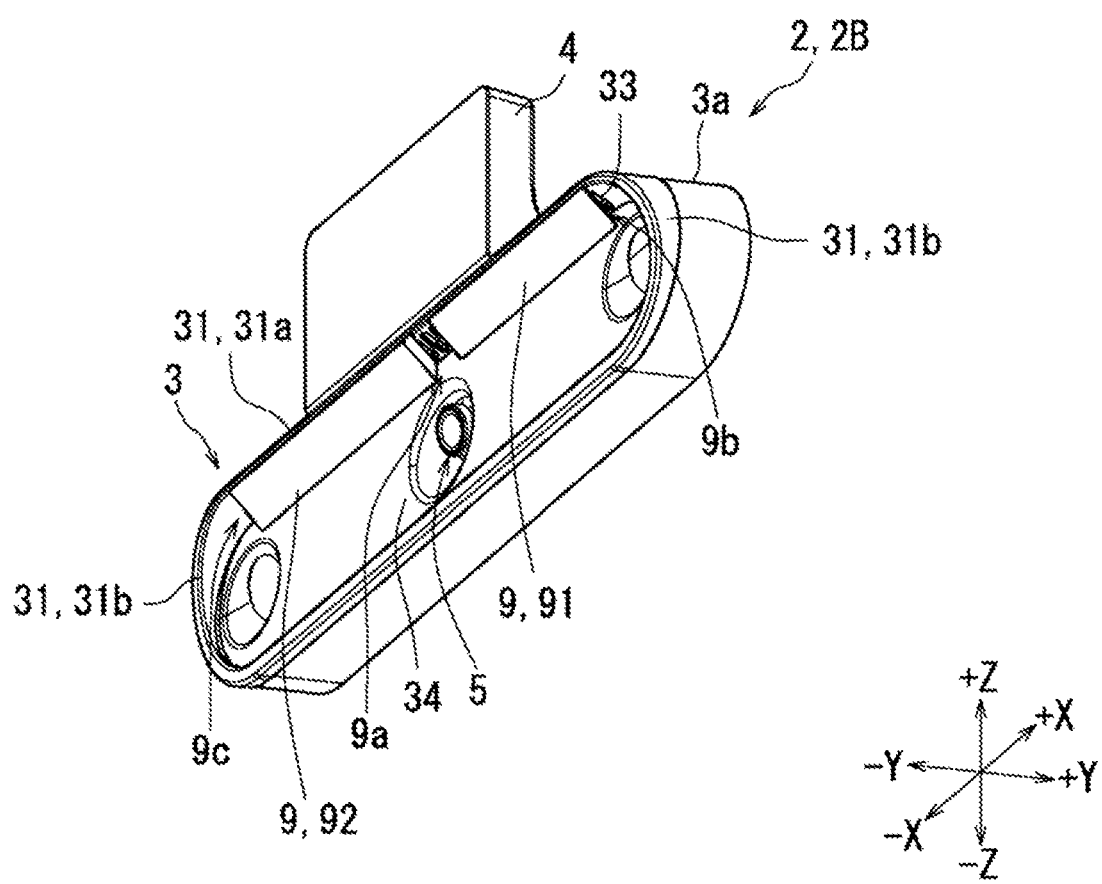
FIG. 8B is another perspective view illustrating the image capturing apparatus according to the second embodiment of the disclosure.

Specifically, the air current disperser 9 is disposed in front of the cover 34 as illustrated in FIG. 8B. Specifically, the air current disperser 9 is disposed at a position facing the position where the outflow ports 33 are formed. Namely, the air current disperser 9 is disposed on the outlet side of the air passage WP of the upper wall 31a described in the first embodiment. The air current disperser 9 disperses the air current W blown out of the outflow ports 33 in the gap G (see FIG. 3) between the window 102 of the heating cooker 100 and the cover 34 of the image capturing unit 3. Namely, the air current disperser 9 disperses the air current W blown out of the outlets of the air passage WP of the upper wall 31a.

More specifically, the air current disperser 9 includes a first air current dispersing portion 91 and a second air current dispersing portion 92 as illustrated in FIG. 8B. The first air current dispersing portion 91 is plate-shaped and extends in the X direction. That is, the first air current dispersing portion 91 extends along the upper wall 31a. A −X-side end of the first air current dispersing portion 91 is located on the +X side of a center of the upper wall 31a in the X direction. A +X-side end of the first air current dispersing portion 91 is spaced apart from the side wall 31b on the +X side. Thus, a gap 9b is formed between the +X-side end of the first air current dispersing portion 91 and the side wall 31b on the +X side. In the following description, the center of the upper wall 31a in the X direction may be referred to as a "center of the upper wall 31a".

The first air current dispersing portion 91 is inclined with respect to the cover 34. Specifically, the first air current dispersing portion 91 is provided extending from the cover 34 to a distal end (a −Y-side end) of the upper wall 31a. Thus, some of the plurality of outflow ports 33 is covered with the first air current dispersing portion 91. Specifically, of the plurality of outflow ports 33, some of the outflow ports 33 located on the +X side of the center of the upper wall 31a are covered with the first air current dispersing portion 91. As a result, an air passage WP11 (see FIG. 8C) is formed between the upper wall 31a and the first air current dispersing portion 91. Hereinafter, the air passage WP11 between the upper wall 31a and the first air current dispersing portion 91 may be referred to as a "first dispersed air passage WP11".

Similar to the first air current dispersing portion 91, the second air current dispersing portion 92 is plate-shaped and extends in the X direction. A +X-side end of the second air current dispersing portion 92 is located on the −X side of the center of the upper wall 31a. Thus, the +X-side end of the second air current dispersing portion 92 is spaced apart from a −X-side end of the first air current dispersing portion 91 and a gap 9a is formed between the +X-side end of the second air current dispersing portion 92 and the −X-side end of the first air current dispersing portion 91. The position where the gap 9a is formed faces the center of the upper wall 31a.

A −X-side end of the second air current dispersing portion 92 is spaced apart from the side wall 31b on the −X side. Thus, a gap 9c is formed between the −X-side end of the second air current dispersing portion 92 and the side wall 31b on the −X side.

Similar to the first air current dispersing portion 91, the second air current dispersing portion 92 is inclined with respect to the cover 34. Thus, some other of the plurality of outflow ports 33 is covered with the second air current dispersing portion 92. Specifically, of the plurality of outflow ports 33, some of the outflow ports 33 located on the −X side of the center of the upper wall 31a are covered with the second air current dispersing portion 92. As a result, an air passage WP12 (see FIG. 8C) is formed between the upper wall 31a and the second air current dispersing portion 92. Hereinafter, the air passage WP12 between the upper wall 31a and the second air current dispersing portion 92 is referred to as a "second dispersed air passage WP12".

Next, the image capturing apparatus 2B of the present embodiment will be described with reference to FIG. 8C. FIG. 8C is a front view of the image capturing apparatus 2B of the present embodiment. FIG. 8C illustrates a cross section of the air current disperser 9 cut along an XZ plane to facilitate understanding. Specifically, FIG. 8C illustrates a cross section of an end portion of the air current disperser 9 on the cover 34 side.

Figure 8C:
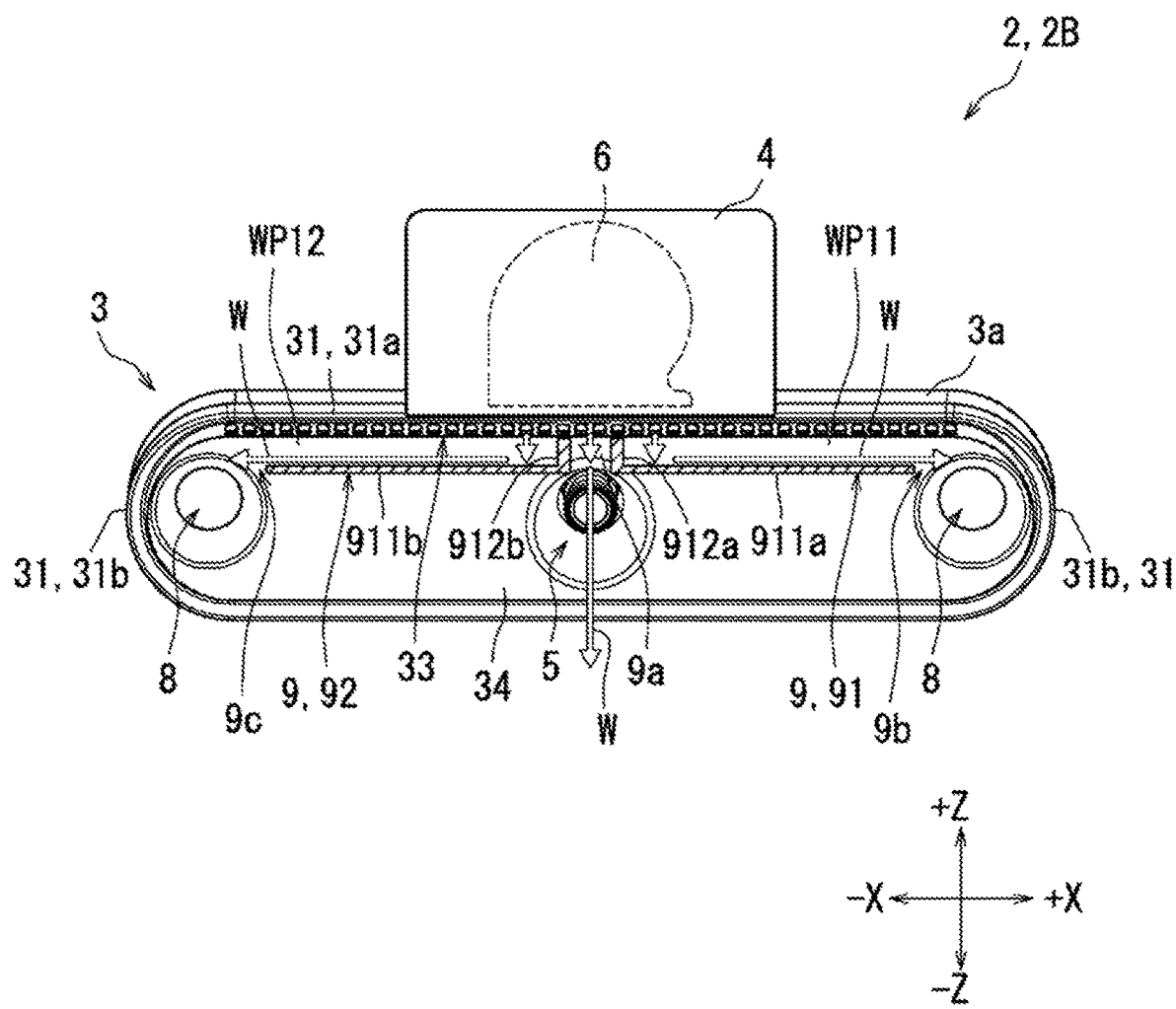
FIG. 8C is a front view of the image capturing apparatus according to the second embodiment of the disclosure.

As illustrated in FIG. 8C, the first air current dispersing portion 91 includes a first long plate 911a and a first wall 912a. The first long plate 911a extends in the X direction. The first wall 912a is connected to a −X-side end portion of the first long plate 911a. The first wall 912a protrudes from the first long plate 911a toward the upper wall 31a.

Similarly, the second air current dispersing portion 92 includes a second long plate 911b and a second wall 912b. The second long plate 911b extends in the X direction. The second wall 912b is connected to a +X-side end portion of the second long plate 911b. The second wall 912b protrudes from the second long plate 911b toward the upper wall 31a. Thus, the second wall 912b faces the first wall 912a in the X direction. The gap 9a is formed between the first wall 912a and the second wall 912b.

An air current W that has flowed into the inside (the air passage WP) of the upper wall 31a from the blower unit 4 is blown mainly out of the first outflow ports 33a (see FIG. 7) as described in the first embodiment. As illustrated in FIG. 8C, a part of the air current W blown out of the first outflow ports 33a (see FIG. 7) passes through the gap 9a (between the first wall 912a and the second wall 912b) and passes in front of the image capturing device 5. Thus, it is possible to reduce the influence of heat from the heating cooker 100 upon the image capturing device 5 as in the first embodiment.

Further, another part of the air current W blown out of the first outflow ports 33a (see FIG. 7) flows into the first dispersed air passage WP11 as illustrated in FIG. 8C. Specifically, the air current W blown out of, of the outflow ports 33, outflow ports 33 located on the +X side of the first wall 912a flows into the first dispersed air passage WP11.

The air current W that has flowed into the first dispersed air passage WP11 flows through the first dispersed air passage WP11 in the +X direction. That is, the air current W that has flowed into the first dispersed air passage WP11 is guided by and flows along the first long plate 911a. As a result, the air current W is blown out of the gap 9b. According to the present embodiment, it is possible to more reliably generate a flow of air current W directed toward the gap 9b because the first air current dispersing portion 91 includes the first wall 912a. According to the present embodiment, it is also possible to increase the amount of air current W directed toward the gap 9b, compared to a configuration in which the first wall 912a is not provided.

The air current W blown out of the gap 9b flows downward (in the −Z direction) by the side wall 31b on the +X side. Thus, the air current W blown out of the gap 9b flows downward through the gap G (see FIG. 3) between the window 102 and the cover 34.

In the present embodiment, one of the two lighting units 8 is located near the side wall 31b on the +X side as illustrated in FIG. 8C. Thus, the air current W blown out of the gap 9b passes in front of the lighting unit 8 on the +X side.

The rest of the air current W blown out of the first outflow ports 33a (see FIG. 7) flows into the second dispersed air passage WP12. Specifically, the air current W blown out of, of the outflow ports 33, outflow ports 33 located on the −X side of the second wall 912b flows into the second dispersed air passage WP12.

The air current W that has flowed into the second dispersed air passage WP12 flows through the second dispersed air passage WP12 in the −X direction. That is, the air current W that has flowed into the second dispersed air passage WP12 is guided by and flows along the second long plate 911b. As a result, the air current W is blown out of the gap 9c. According to the present embodiment, it is possible to more reliably generate a flow of air current W directed toward the gap 9c because the second air current dispersing portion 92 includes the second wall 912b. According to the present embodiment, it is also possible to increase the amount of air current W directed toward the gap 9c, compared to a configuration in which the second wall 912b is not provided.

The air current W blown out of the gap 9c flows downward (in the −Z direction) by the side wall 31b on the −X side. Thus, the air current W blown out of the gap 9c flows downward through the gap G (see FIG. 3) between the window 102 and the cover 34.

In the present embodiment, the other of the two lighting units 8 is located near the side wall 31b on the −X side as illustrated in FIG. 8C. Thus, the air current W blown out of the gap 9c passes in front of the lighting unit 8 on the −X side.

The second embodiment of the disclosure has been described above with reference to FIGS. 8A to 8C. According to the present embodiment, the air current disperser 9 can disperse the air current W flowing through the gap G (see FIG. 3) between the window 102 of the heating cooker 100 and the cover 34 of the image capturing unit 3. Thus, it is possible to further limit the temperature rise of the image capturing unit 3 due to radiant heat from the window 102 because air currents W can be generated in a wider range.

Further, according to the present embodiment, the air current W blown out of the gap 9b passes in front of the lighting unit 8 on the +X side and the air current W blown out of the gap 9c passes in front of the lighting unit 8 on the −X side. Thus, it is possible to limit the temperature rise of the lighting units 8 due to radiant heat from the window 102. Thus, it is possible to reduce the influence of heat from the heating cooker 100 upon the lighting units 8 as in the first embodiment.

Third Embodiment

Next, a third embodiment of the disclosure will be described with reference to FIGS. 9A and 9B. Matters different from those of the first and second embodiments will be described and description of the same matters as those of the first and second embodiments will be omitted. The third embodiment differs from the first and second embodiments in that the blower unit 4 includes an air current disperser 7. Hereinafter, the image capturing apparatus 2 according to the third embodiment may be referred to as an "image capturing apparatus 2C".

Figure 9A:
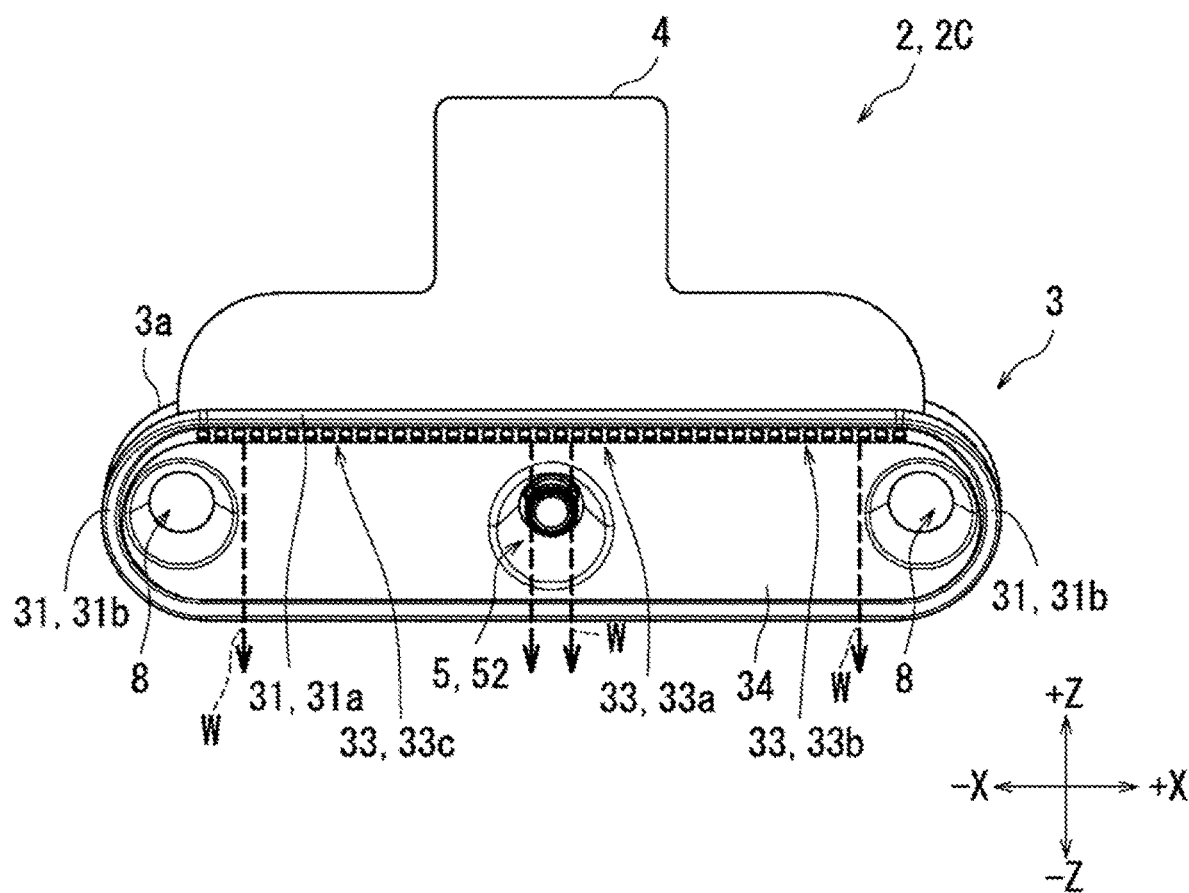
FIG. 9A is a front view of an image capturing apparatus according to a third embodiment of the disclosure.

FIG. 9A is a front view of the image capturing apparatus 2C of the present embodiment. FIG. 9B is a view illustrating a cross section of the blower unit 4 included in the image capturing apparatus 2C of the present embodiment. As illustrated in FIG. 9B, the blower unit 4 includes the air current disperser 7. The air current disperser 7 disperses an air current W blown out of the blower device 6. As a result, the air current W dispersed by the air current disperser 7 is blown out of the upper wall 31a toward the gap G (see FIG. 3) between the window 102 of the heating cooker 100 and the cover 34 of the image capturing unit 3 as illustrated in FIG. 9A.

Figure 9B:
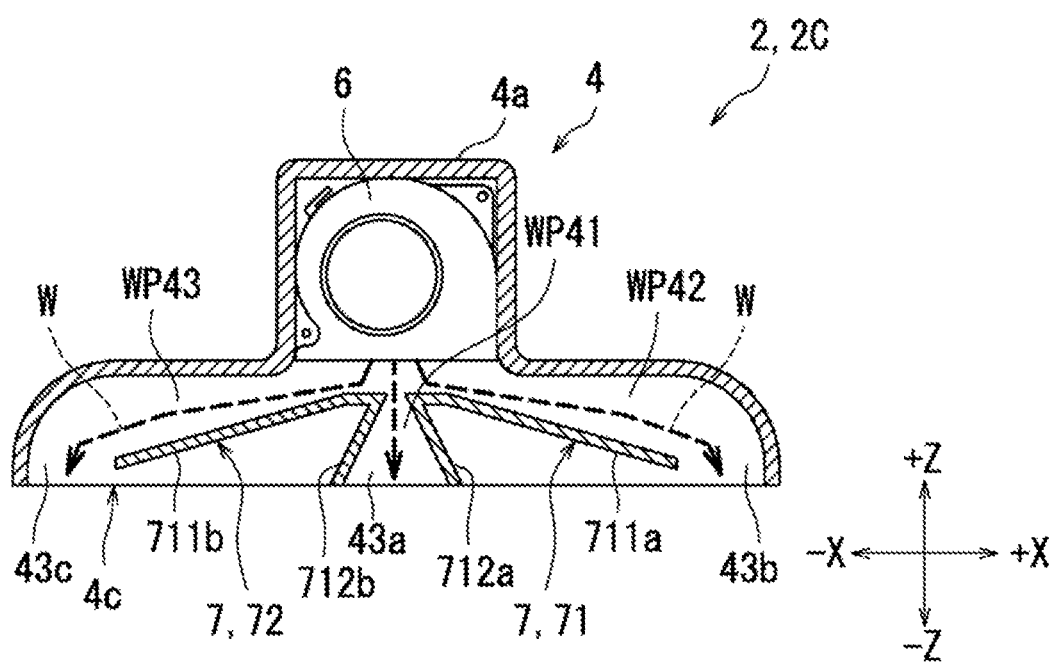
FIG. 9B is a view illustrating a cross section of a blower unit included in the image capturing apparatus according to the third embodiment of the disclosure.

Specifically, the air current disperser 7 is accommodated within the housing 4a as illustrated in FIG. 9B. The air current disperser 7 is disposed below the blower device 6. The air current disperser 7 forms first to third air passages WP41 to WP43 inside the housing 4a. The air current W blown out of the blower device 6 is dispersed into the first to third air passages WP41 to WP43 by the air current disperser 7 and flows along the first to third air passages WP41 to WP43. The first to third air passages WP41 to WP43 guide the air current W to different positions in an opening 4c at the lower surface (the −Z-side surface) of the housing 4a.

Specifically, the air current disperser 7 includes a first air current dispersing portion 71 and a second air current dispersing portion 72. The first air current dispersing portion 71 includes a first long plate 711a and a first wall 712a. The second air current dispersing portion 72 includes a second long plate 711b and a second wall 712b.

The first air current dispersing portion 71 is disposed on the +X side of the second air current dispersing portion 72. The first air current dispersing portion 71 is provided at a position away from the second air current dispersing portion 72. Thus, the first air current dispersing portion 71 and the second air current dispersing portion 72 face each other in the X direction. Specifically, the first wall 712a and the second wall 712b face each other in the X direction.

The first wall 712a and the second wall 712b form the first air passage WP41 between the first wall 712a and the second wall 712b. Namely, the first air passage WP41 is a gap between the first wall 712a and the second wall 712b. The position where the first air passage WP41 is formed faces the center in the X direction of an air outlet of the blower device 6.

The first wall 712a is connected to a −X-side end portion of the first long plate 711a. The first wall 712a protrudes downward (in the −Z direction) from the −X-side end portion of the first long plate 711a. Namely, the first wall 712a protrudes from the first long plate 711a toward the opening 4c at the lower surface of the housing 4a. Specifically, the first wall 712a protrudes obliquely downward from the −X-side end portion of the first long plate 711a toward the +X side.

Similarly, the second wall 712b is connected to a +X-side end portion of the second long plate 711b. The second wall 712b protrudes downward (in the −Z direction) from the +X-side end portion of the second long plate 711b. Namely, the second wall 712b protrudes from the second long plate 711b toward the opening 4c at the lower surface of the housing 4a. Specifically, the second wall 712b protrudes obliquely downward from the +X-side end portion of the second long plate 711*b* toward the −X side.

A part of the air current W blown out of the blower device 6 flows into the first air passage WP41. The first air passage WP1 extends in the Z direction. An outlet 43*a* of the first air passage WP41 communicates with the opening 4*c* at the lower surface of the housing 4*a*. The part of the air current W blown out of the blower device 6 passes through the first air passage WP41 and is blown in the −Z direction (downward) out of the outlet 43*a* of the first air passage WP41.

The outlet 43*a* of the first air passage WP41 communicates with the first inflow ports 32*a* described with reference to FIG. 3. Thus, as illustrated in FIG. 9A, the air current W blown out of the outlet 43*a* of the first air passage WP41 flows into the first inflow ports 32*a* and is then blown mainly out of the first outflow ports 33*a* and passes in front of the image capturing device 5. Thus, it is possible to reduce the influence of heat from the heating cooker 100 upon the image capturing device 5 as in the first embodiment.

The first long plate 711*a* extends to the +X side from a +Z-side end portion of the first wall 712*a*. The first long plate 711*a* extends obliquely downward from the +Z-side end portion of the first wall 712*a*. That is, the first long plate 711*a* is inclined to the −Z side. Specifically, the first long plate 711*a* extends obliquely toward a +X-side end portion of the opening 4*c* of the housing 4*a*.

The first long plate 711*a* is spaced apart from an inner wall surface of the housing 4*a*. The first long plate 711*a* forms the second air passage WP42 together with the inner wall surface of the housing 4*a*. An outlet 43*b* of the second air passage WP42 communicates with the opening 4*c* at the lower surface of the housing 4*a*. More specifically, the outlet 43*b* of the second air passage WP42 communicates with the +X-side end portion of the opening 4*c* of the housing 4*a*.

Another part of the air current W blown out of the blower device 6 passes through the second air passage WP42 and is blown in the −Z direction (downward) out of the outlet 43*b* of the second air passage WP42. The outlet 43*b* of the second air passage WP42 communicates with the second inflow ports 32*b* described with reference to FIG. 6. Thus, as illustrated in FIG. 9A, the air current W blown out of the outlet 43*b* of the second air passage WP42 flows into the second inflow ports 32*b* and is then blown mainly out of the second outflow ports 33*b* and passes in front of the lighting unit 8 on the +X side.

The second long plate 711*b* extends from a +Z-side end portion of the second wall 712*b* to the −X side. The second long plate 711*b* extends obliquely downward from the +Z-side end portion of the second wall 712*b*. That is, the second long plate 711*b* is inclined to the −Z side. Specifically, the second long plate 711*b* extends obliquely toward a −X-side end portion of the opening 4*c* of the housing 4*a*.

The second long plate 711*b* is spaced apart from the inner wall surface of the housing 4*a*. The second long plate 711*b* forms the third air passage WP43 together with the inner wall surface of the housing 4*a*. An outlet 43*c* of the third air passage WP43 communicates with the opening 4*c* at the lower surface of the housing 4*a*. More specifically, the outlet 43*c* of the third air passage WP43 communicates with the −X-side end portion of the opening 4*c* of the housing 4*a*.

The rest of the air current W blown out of the blower device 6 passes through the third air passage WP43 and is blown in the −Z direction (downward) out of the outlet 43*c* of the third air passage WP43. The outlet 43*c* of the third air passage WP43 communicates with the third inflow ports 32*c* described with reference to FIG. 6. Thus, as illustrated in FIG. 9A, the air current W blown out of the outlet 43*c* of the third air passage WP43 flows into the third inflow ports 32*c* and is then blown mainly out of the third outflow ports 33*c* and passes in front of the lighting unit 8 on the −X side.

The third embodiment of the disclosure has been described above with reference to FIGS. 9A and 9B. According to the present embodiment, the air current disperser 7 can disperse the air current W flowing through the gap G (see FIG. 3) between the window 102 of the heating cooker 100 and the cover 34 of the image capturing unit 3. Thus, it is possible to further limit the temperature rise of the image capturing unit 3 due to radiant heat from the window 102 because air currents W can be generated in a wider range.

Further, according to the present embodiment, the air current W blown out of the outlet 43*b* of the second air passage WP42 passes in front of the lighting unit 8 on the +X side and the air current blown out of the outlet 43*c* of the third air passage WP43 passes in front of the lighting unit 8 on the −X side. Thus, it is possible to limit the temperature rise of the lighting units 8 due to radiant heat from the window 102. Thus, it is possible to reduce the influence of heat from the heating cooker 100 upon the lighting units 8 as in the first embodiment.

Embodiments of the disclosure have been described above with reference to the drawings (FIGS. 1 to 9B). However, the disclosure is not limited to the above embodiments and can be embodied in various modes without departing from the spirit of the disclosure. The plurality of components disclosed in the above embodiments can also be modified as appropriate. For example, some components illustrated in an embodiment may be added to the components of another embodiment or some components illustrated in an embodiment may be removed from the embodiment.

To facilitate understanding of the disclosure, the drawings schematically illustrate each component with emphasis. The thickness and length of the components, the number of components, the spacing therebetween, and the like may be differed from the actual ones for convenience of drawing. The configuration of each component illustrated in the above embodiments is an example and is not particularly limited and it goes without saying that various modifications are possible without substantially departing from the effects of the disclosure.

For example, although the magnets 35 and 42 are used to make the image capturing unit 3 and the blower unit 4 freely attachable to and detachable from each other in the embodiments described with reference to FIGS. 1 to 9B, the configuration for making the image capturing unit 3 and the blower unit 4 freely attachable to and detachable from each other is not limited to the configuration using the magnets 35 and 42. For example, the housing 3*a* of the image capturing unit 3 and the housing 4*a* of the blower unit 4 may be provided with shapes that engage with each other in addition to or instead of the magnets 35 and 42, respectively. Alternatively, the image capturing unit 3 and the blower unit 4 may be provided with members that engage with each other, respectively.

Although the magnets 35 and 42 are used in the embodiments described with reference to FIGS. 1 to 9B, one of the magnets 35 and 42 may be replaced with a ferromagnetic body.

Although the blower unit 4 is attached to the door 101 of the heating cooker 100 in the embodiments described with reference to FIGS. 1 to 9B, the location where the blower unit 4 is attached is not limited to the door 101. For example, the blower unit 4 may be attached to the window 102. Alternatively, the blower unit 4 may be attached to the handle 103. Specifically, the housing 4a of the blower unit 4 may be provided with a shape that engages with the handle 103. Alternatively, the blower unit 4 may be provided with a member that engages with the handle 103.

Although the image capturing unit 3 is disposed below the blower unit 4 in the embodiments described with reference to FIGS. 1 to 9B, the image capturing unit 3 may be disposed above the blower unit 4 or may be disposed on the left side or the right side of the blower unit 4.

Although the blower unit 4 is freely attachable to and detachable from the heating cooker 100 in the embodiments described with reference to FIGS. 1 to 9B, the blower unit 4 may be fixed to the heating cooker 100.

Although the image capturing unit 3 and the blower unit 4 are freely attachable to and detachable from each other in the embodiments described with reference to FIGS. 1 to 9B, the image capturing unit 3 may be fixed to the blower unit 4.

INDUSTRIAL APPLICABILITY

The disclosure is useful for an apparatus that captures an image of how cooking with heat is performed by a heating cooker.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An image capturing apparatus attachable to a heating cooker that heats food, the image capturing apparatus comprising:
    an image capturing unit configured to perform image capturing; and
    a blower unit supported by the heating cooker, the blower unit being freely attachable to and detachable from the heating cooker,
    wherein the blower unit supports the image capturing unit and disposes the image capturing unit at a position facing the heating cooker,
    the blower unit is configured to generate an air current that flows through a gap between the heating cooker and the image capturing unit,
    the air current generated by the blower unit is a first air current,
    the image capturing unit includes a wall contacting the blower unit,
    the wall includes a contact region in which the wall contacts the blower unit and a non-contact region outside the contact region,
    the wall includes a first air passage in the contact region and a second air passage in the non-contact region,
    the first air current flows from the blower unit into the first air passage, through the first air passage, and then out of the first air passage toward the gap between the heating cooker and the image capturing unit, and
    due to a suction force caused by the first air current flowing through the gap between the heating cooker and the image capturing unit, air outside the image capturing apparatus flows into the second air passage to generate a second air current that flows through the second air passage and then out of the second air passage toward the gap between the heating cooker and the image capturing unit.

2. The image capturing apparatus according to claim 1, wherein the image capturing unit is freely attachable to and detachable from the blower unit.

3. The image capturing apparatus according to claim 1, wherein the heating cooker includes
    a main body including therein a cooking space in which food is heated, and
    a window that is disposed at the main body and through which an inside of the cooking space is visible from outside the heating cooker, and
    with the image capturing unit being supported by the blower unit, the image capturing unit faces the window and captures an image of the inside of the cooking space through the window.

4. The image capturing apparatus according to claim 1, wherein the image capturing unit further includes an air current disperser disposed in the gap between the heating cooker and the image capturing unit, and
    the air current disperser disperses the air current generated by the blower unit.

5. The image capturing apparatus according to claim 1, wherein the blower unit includes
    a blower device configured to generate the air current, and
    an air current disperser configured to disperse the air current blown out of the blower device, and
    the air current dispersed by the air current disperser is blown out of the blower unit toward the gap between the heating cooker and the image capturing unit.

* * * * *